(12) United States Patent
Syassen

(10) Patent No.: US 12,151,300 B2
(45) Date of Patent: Nov. 26, 2024

(54) METHOD FOR PRODUCING A LOAD-BEARING ELEMENT FOR TRANSPORTATION, AND A LOAD-BEARING ELEMENT PRODUCED ACCORDINGLY

(71) Applicant: Airbus Operations GmbH, Hamburg (DE)

(72) Inventor: Freerk Syassen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 423 days.

(21) Appl. No.: 17/536,728

(22) Filed: Nov. 29, 2021

(65) Prior Publication Data

US 2022/0152730 A1 May 19, 2022

Related U.S. Application Data

(63) Continuation of application No. PCT/EP2020/063525, filed on May 14, 2020.

(30) Foreign Application Priority Data

May 29, 2019 (DE) ............... 10 2019 114 403.5

(51) Int. Cl.
| | |
|---|---|
| *B23K 20/12* | (2006.01) |
| *B64C 1/00* | (2006.01) |
| *B64C 1/20* | (2006.01) |
| *B64F 5/10* | (2017.01) |
| *B23K 101/28* | (2006.01) |
| *B23K 103/18* | (2006.01) |

(52) U.S. Cl.
CPC ............ *B23K 20/1215* (2013.01); *B64C 1/00* (2013.01); *B64C 1/20* (2013.01); *B64F 5/10* (2017.01); *B23K 2101/28* (2018.08); *B23K 2103/18* (2018.08); *B64C 2001/0081* (2013.01)

(58) Field of Classification Search
CPC ..................... B23K 20/1215; B23K 2101/18
See application file for complete search history.

(56) References Cited

U.S. PATENT DOCUMENTS

2012/0145867 A1   6/2012   Benthien et al.

FOREIGN PATENT DOCUMENTS

| CN | 107971624 A | * | 5/2018 | ......... B23K 20/1215 |
| FR | 2963262 A1 | | 2/2012 | |
| WO | WO-2010097221 A1 | * | 9/2010 | ............ B23K 20/12 |

OTHER PUBLICATIONS

English translation Li CN107971624 (Year: 2018).*

(Continued)

*Primary Examiner* — Jason L Vaughan
*Assistant Examiner* — Amanda Kreiling
(74) *Attorney, Agent, or Firm* — KDW Firm PLLC

(57) ABSTRACT

A method for producing a supporting element for a transportation device or vehicle, having steps of providing a flat base chord made of a first material having a first surface and a second surface, applying at least one layer of at least one second material to the first surface using a friction-based application or welding method, and machining the at least one layer of the second material to produce a desired profile cross section of the supporting element, wherein the first material and the second material are different metallic materials.

18 Claims, 3 Drawing Sheets

(56) References Cited

OTHER PUBLICATIONS

English translation Kaufmann WO2010097221 (Year: 2010).*
German Search Report for Application No. 102019114403 dated Jan. 22, 2020.
International Search Report for Application No. PCT/EP2020/063525 dated Aug. 19, 2020.

* cited by examiner

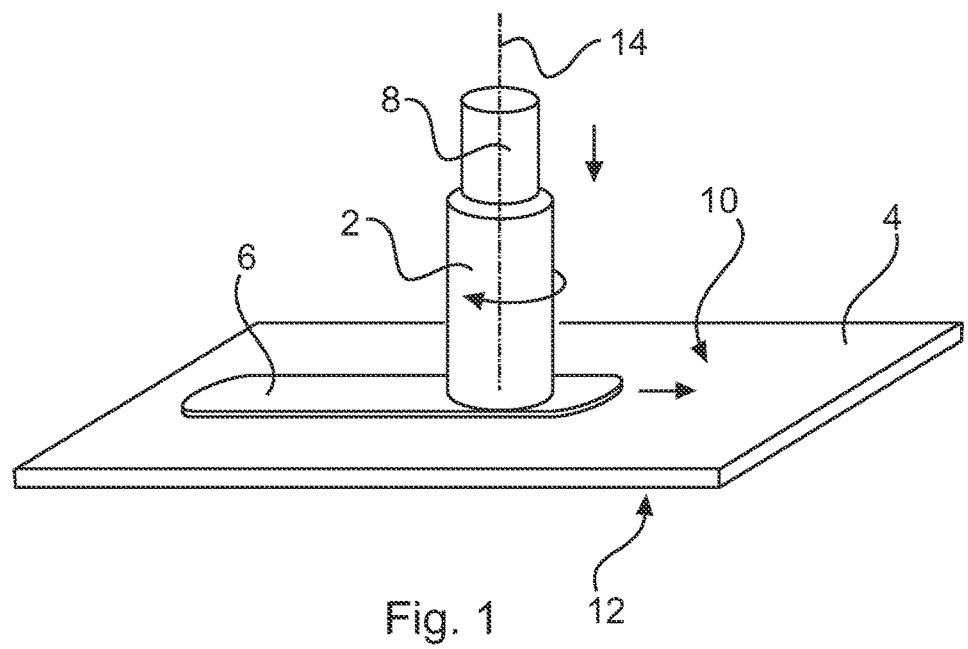
Fig. 1
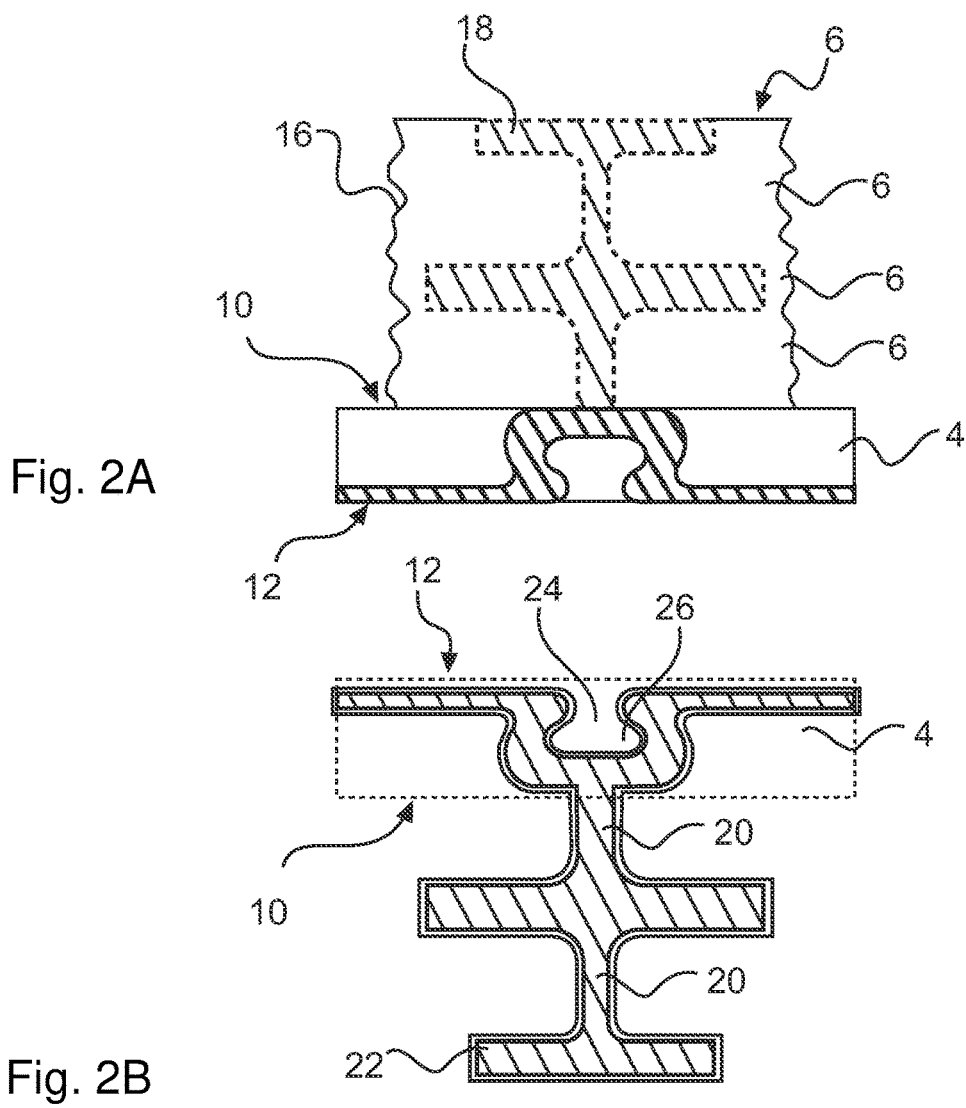
Fig. 2A
Fig. 2B

METHOD FOR PRODUCING A LOAD-BEARING ELEMENT FOR TRANSPORTATION, AND A LOAD-BEARING ELEMENT PRODUCED ACCORDINGLY

CROSS-REFERENCE TO RELATED APPLICATIONS

This application is a continuation of and claims priority to Application No. PCT/EP2020/063525 filed May 14, 2020, which claims priority to German Patent Application No. 10 2019 114 403.5 filed May 29, 2019, the entire disclosures of which are incorporated by reference herein.

TECHNICAL FIELD

The disclosure herein relates to a method for producing a supporting element for transportation, to a supporting element for transportation and to an aircraft having an aircraft fuselage and a structure which is formed therein and has at least one such supporting element.

BACKGROUND

Depending on the application, different requirements are imposed on structural components which are arranged in the interiors of commercial aircraft and other transportation devices or vehicles. In order to fasten fittings in a cabin, use is made of supporting elements which run approximately in the longitudinal direction of the cabin and are part of a floor support or are fastened thereon. Since considerable loads are assumed in a commercial aircraft for the dimensioning of such supporting elements, they are usually provided with a correspondingly high strength.

Furthermore, such structural components are also exposed to dirt and varying moisture conditions due to frequent use, and therefore adequate corrosion resistance is necessary. In order to achieve high strength and excellent corrosion resistance, some sections of seat rails or rails for receiving cabin monuments, for example, are already produced from titanium in some modern commercial aircraft. However, this material is expensive to machine. The practice of producing such rails completely from titanium in corrosion-sensitive regions is known, but this is very expensive. Although a combination of a section made from titanium and a section made from a different material could be advantageous for weight and cost reasons, components made from other materials cannot be joined to titanium components or cannot be joined with the desired properties to titanium components by adhesive bonding, fusion welding or brazing. This can lead to the necessity of employing positive or non-positive connection methods for this purpose. Owing to the high cost of machining titanium components, the production of a rail consisting of or comprising titanium and additionally other materials is very expensive.

SUMMARY

It is therefore an object of the subject matter herein to disclose an alternative method for producing a supporting element for transportation in which sections of titanium and of another material can be connected to one another in a low-cost manner but can be produced with a high strength and desired component properties.

This object is achieved by a method disclosed herein. Advantageous embodiments and developments are disclosed herein.

The disclosure herein relates to a method for producing a supporting element for transportation, having the steps of providing a flat base chord made of a first material having a first surface and a second surface, applying at least one layer of at least one second material to the first surface using a friction-based application or welding method, and machining the at least one layer of the second material to produce a desired profile cross section of the supporting element, wherein the first material and the second material are different metallic materials.

A flat base chord is to be understood as part of a supporting element which has a certain profile. The base chord could, for example, have a flat, strip-like shape and, in the further course of the production of the supporting element, could be supplemented with a web or some other component to be connected to the base chord to form a complete supporting element. The base chord could function, for example, as a receiving surface and/or fastening surface for fittings in a cabin of a transportation device.

According to the disclosure herein, the flat base chord is produced from the first material. The first surface and the second surface can be geometrical main surfaces of the base chord, which each extend in the main plane of extent and delimit the base chord on two mutually opposite sides. In particular, they can therefore be embodied parallel to one another.

By a friction-based method, the at least one layer of the at least one second material is then applied to the first surface. It has surprisingly been found that a friction-based method, for example an additive friction-stir method, enables different material combinations to be combined very effectively. In such a method, the second material is stirred into or onto the first surface by a rotating tool pressed onto the base chord. This results, in particular, in a high-strength connection between the first material and the second material with a refined grain structure. No further compaction step is required to improve the material properties.

One particular advantage achieved thereby is that further components consisting of or comprising the second material or of another material can be attached to the second material. The at least one layer of the second material can thus act as an interface between the base chord and another component which is produced from the second material or another material and cannot be connected directly to the base chord.

In an example suitable for use as a supporting element in an interior of a commercial aircraft, the base chord can be made, for example, of titanium, while the second material can be an alloy based on aluminum. It is almost impossible to use adhesive bonding, fusion welding and brazing for joining these two materials, and therefore, according to the disclosure herein, the application of aluminum to the base chord provides a basis for further components made of aluminum. Conventional methods can be used for this purpose. Consequently, the method according to the disclosure herein can allow a particularly advantageous and high-strength connection between different materials to produce a supporting element.

As a particular preference, the method further has the step of joining an additional component to the at least one layer of the second material. Consequently, the base chord could form only a more or less small proportion of a profile of the supporting element. Webs, flanges, chords and other components can supplement the base chord to form a complete supporting element. Here, attachment is accomplished via the at least one layer of the second material.

It is expedient to produce the additional component from the second material. The component and the at least one second layer are thus fully compatible and can be joined by conventional joining methods.

The method may further have the step of machining the second surface to produce a depression extending along the base chord. As a result, the base chord can take the form of a rail, in particular a seat rail for passenger seats or a support rail for cabin monuments or other fittings in the interior. The depression can be an elongate depression and/or can be embodied as a series of individual depressions arranged in a row. The first surface, the at least one layer of the second material and all optional components arranged thereon adjoin one another on a side facing away from the base chord and can form a supporting structure which is integrated into a floor structure, for example. The base chord could then end flush with the floor.

It is particularly advantageous if a profile height of the profile cross section of the supporting element is not constant along a main direction of extent of the base chord. The profile cross section can be configured as desired irrespective of the processability of the first material since even relatively complex shapes can be connected firmly to the base chord by connection to the at least one layer of the second material. In spite of the use of titanium or similar high-strength materials to provide a receiving surface, this permits virtually arbitrary shaping of supporting elements, for example.

In an advantageous embodiment, the profile cross section of the supporting element has at least one lower chord arranged opposite the base chord, wherein at least one web extends between the base chord and the at least one lower chord. The web and the lower chord could be produced from the second material or could be compatible therewith and could be obtained by other methods. For components with a constant profile cross section, an extrusion method could be worthwhile. For other components which are variable in profile, machining or additive methods could be considered, in particular.

As explained above, the base chord could comprise titanium. In this way, a high-strength supporting and/or fastening surface can be achieved, in particular for fittings in a cabin of a transportation device.

Since, for reasons of strength, it is not necessary to produce the entire supporting element from a high-strength material, for example titanium, the second material can have a somewhat lower strength and can provide a sufficient second moment of area by a suitable configuration. In an advantageous embodiment, the at least one layer of the second material may comprise aluminum. By the friction-based method, for example an additive friction-stir method, at least one layer of aluminum can be arranged on the base chord and allow the arrangement of further components of aluminum.

The disclosure herein furthermore relates to a supporting element for a transportation device or vehicle, having a flat base chord made of a first material having a first surface and a second surface, and at least one layer of at least one second material, which is applied to the first surface using a friction-based application or welding method and is machined, thus ensuring that the supporting element has a desired profile cross section, wherein the first material and the second material are different metallic materials.

As explained above, in an advantageous embodiment, a profile height of the profile cross section of the supporting element is not constant along a main direction of extent of the base chord. Here, the main direction of extent can be a running direction of the base chord which runs parallel to at least one longitudinal edge or a central axis lying between longitudinal edges.

Furthermore, the profile cross section of the supporting element could have at least one lower chord arranged opposite the base chord, wherein at least one web extends between the base chord and the at least one lower chord. The web serves for the spatially defined arrangement of the base chord and of the lower chord to create a desired second moment of area. It can have one or more cutouts or bores to reduce the weight.

As already explained above, the base chord may comprise titanium.

The at least one layer of the second material may furthermore comprise aluminum, as likewise mentioned above.

It is advantageous if the second surface has a depression extending along the base chord to receive connecting elements. This enables placement or fastening of fittings to be carried out. It is conceivable for the depression to have an undercut profile which has a plurality of circular openings which follow one another along the main direction of extent of the supporting element and through which a slot passes.

In a particularly advantageous embodiment, an additional component is connected materially to the at least one layer of the second material and is produced from the second material, is compatible therewith or comprises the material.

The supporting element could be selected from a group of supporting elements, the group comprising a floor rail, a crossmember, a longitudinal member, a longeron, a stringer, and a frame.

Finally, the disclosure herein relates to an aircraft having an aircraft fuselage with a structure formed therein, the structure having at least one supporting element as described above.

BRIEF DESCRIPTION OF THE DRAWINGS

Further features, advantages and possible applications of the disclosure herein will be found in the following description of the example embodiments and the figures. In this context, all the features described and/or illustrated graphically form the subject matter of the disclosure herein in themselves and in any desired combination, irrespective of their combination in the individual claims or the dependency references thereof. In the figures, the same reference signs are furthermore used for identical or similar objects.

FIG. 1 shows a schematic illustration of a suitable tool for arranging a layer of the second material.

FIGS. 2A and 2B show an arrangement of layers of the second material (FIG. 2A) and a final contour after machining (FIG. 2B).

DETAILED DESCRIPTION

Figure 3A:
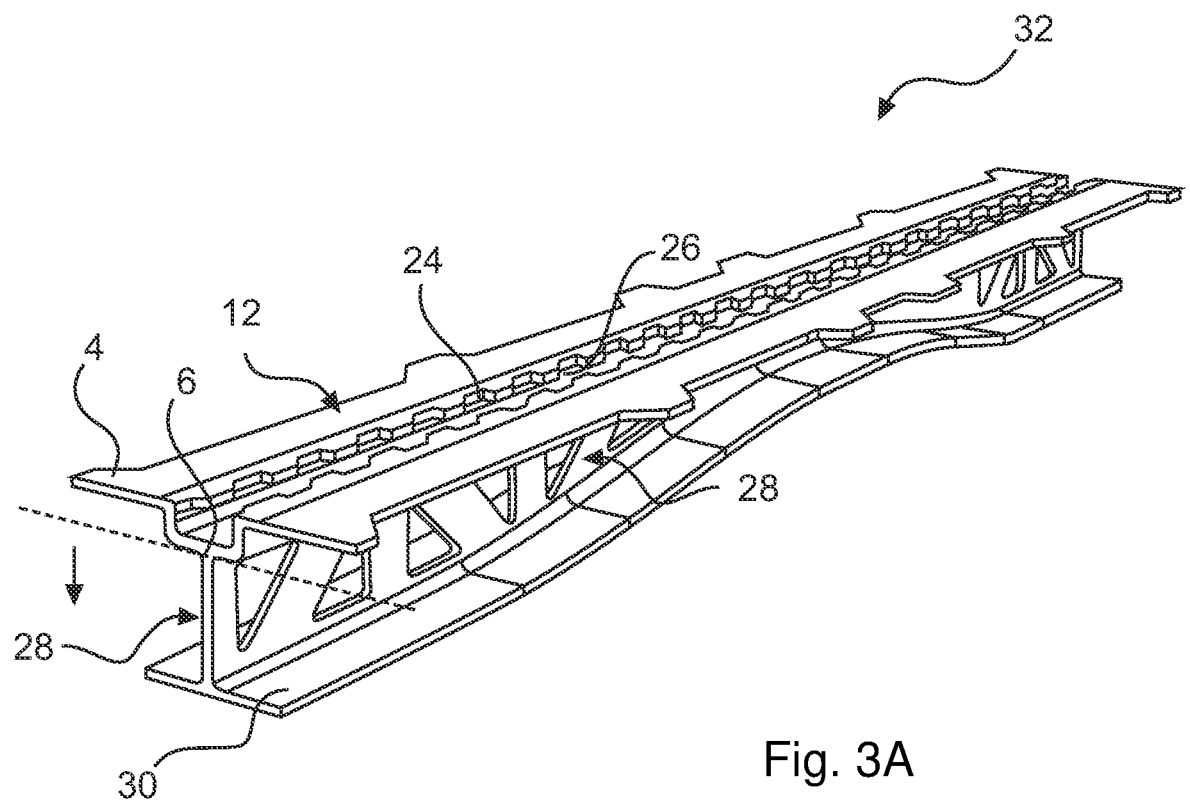
FIGS. 3A and 3B show a supporting element in a three-dimensional representation.

FIG. 1 schematically illustrates a tool 2 for application by friction stirring, which applies to a flat base chord 4, which is made of a first material, a layer 6 of a different second material 8. The base chord 4 can consist of or comprise titanium, for example. It rests on a support (not shown), with the result that a first surface 10 for applying the second material 8 is directed toward the tool 2, and a second surface 12 rests on the support. The tool 2 is rotated about an axis of rotation 14 and pressed along the axis onto the first surface 10, with the result that the second material 8 heats up under the action of pressure and friction and is pressed into the first surface 10. This gives rise to the schematically illustrated layer 6.

It is evident that several layers 6 may also be applied one on top of the other and next to one another to the first surface 10. In this way, virtually any desired built-up thicknesses and contours could be created. If the base chord 4 is made of titanium and the second material 8 is aluminum, a high-strength joint between the layer 6 and the base chord 4 can be achieved by the tool 2. Further layers 6 or components of the same second material 8 or of a compatible material can be applied to the layer 6.

FIG. 2A illustrates the base chord 4, on which several layers 6 are arranged. These initially still have inaccurate profile contours 16, explained by comparatively blurred edges of the layers 6. A final contour 18 is illustrated in dashed lines, which represents a subsequent profile geometry and is machined out of the arrangement of layers 6 by milling, grinding or other cutting methods.

The final contour 18 is illustrated again separately in FIG. 2B. Here, webs 20 and flanges 22 are arranged which supplement the base chord 4 to form a complete supporting element with a desired second moment of area and required connection surfaces. It is conceivable here for the base chord 4 also to have a depression 24 which extends into and through the second surface 12. By way of example, the depression 24 has undercuts 26, which can be used for the attachment and clamping of connecting means.

In addition to the layered structure due to the application of several layers 6, it would also be conceivable, in addition to at least one layer 6, to apply one or more separate components 28 to the base chord 4. For this purpose, for example, a single layer 6 of the second material could be sufficient to attach components 28 consisting of or comprising a compatible material thereto by conventional joining methods that involve material bonding. It would be possible, for example, to attach a plurality of webs 28 as components, which are furthermore supplemented by a lower chord 30 on a side of the webs 28 which is spaced apart from the base chord 4. The webs can be attached transversely to the base chord 4, e.g. perpendicularly thereto.

Figure 3B:
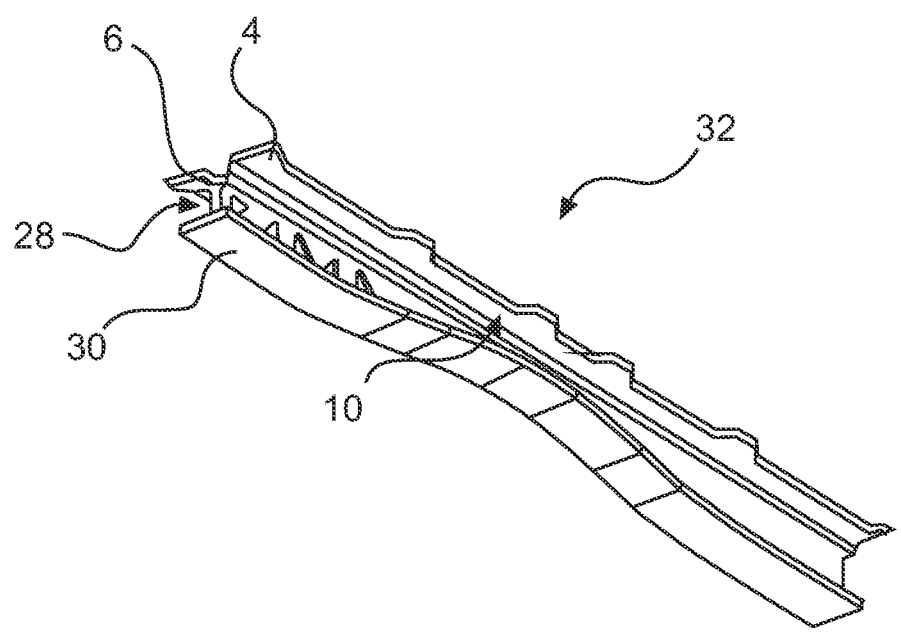

Since the method is very flexible, a completely variable profile cross section can be ensured, unlike in the case of pure extrusion. In FIGS. 3A and 3B, for example, this is expressed by a variable distance between the base chord 4 and the lower chord 30. The lower chord 30 has a flat shape which is curved transversely to its main direction of extent and is connected to the base chord 4 by webs 28 of different lengths. As a result, it is possible, in particular, to achieve a weight- and load-optimized configuration of a supporting element 32.

Figure 4:
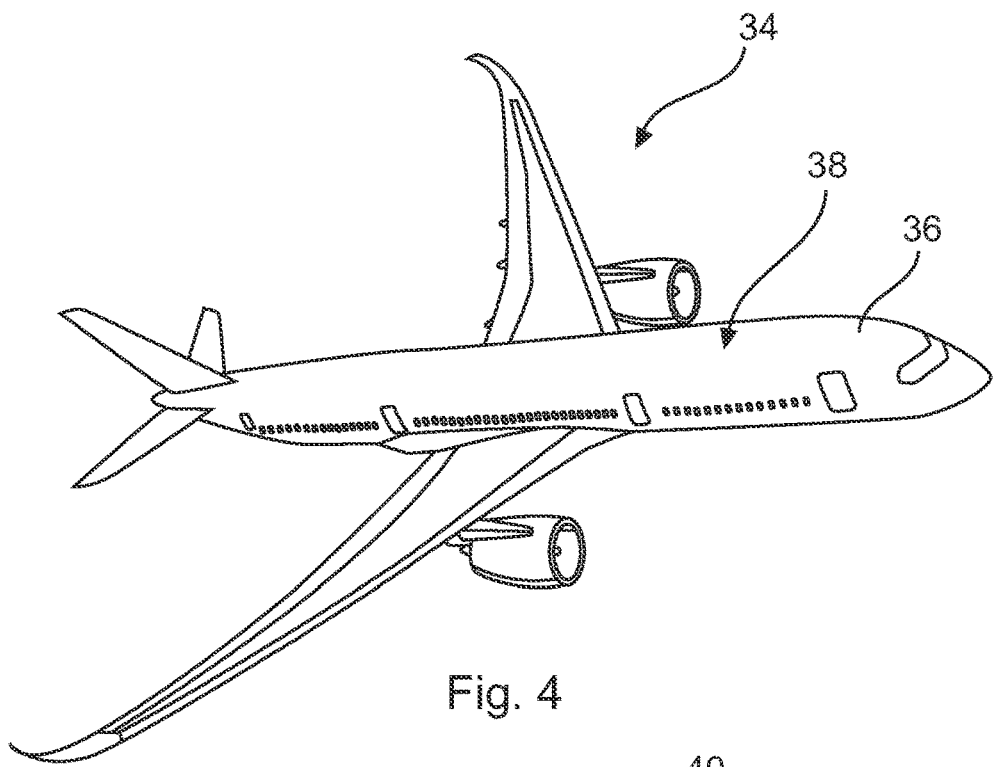
FIG. 4 shows an aircraft.

FIG. 4 furthermore shows an aircraft 34 having a fuselage 36, an interior 38 formed therein, and at least one supporting element in the interior 38.

Figure 5:
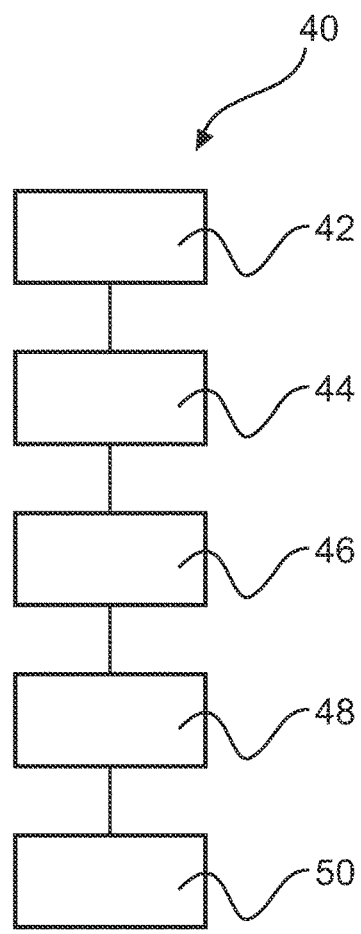
FIG. 5 shows a method according to the disclosure herein in a schematic, block-based illustration.

For the sake of completeness, FIG. 5 illustrates a schematic sequence of a method according to the disclosure herein. A method 40 for producing a supporting element for a transportation device or vehicle has the steps of providing 42 a flat base chord made of a first material having a first surface and a second surface, applying 44 at least one layer of at least one second material to the first surface using a friction-based application or welding method, and machining 46 the at least one layer of the second material to produce a desired profile cross section of the supporting element. The method may further comprise joining 48 an additional component to the at least one layer of the second material. The method may further have the step of machining 50 the second surface to produce a depression extending along the base chord.

In addition, it should be noted that "having" does not exclude other elements or steps and "a" or "an" does not exclude a multiplicity. Furthermore, it should be noted that features which have been described with reference to one of the above example embodiments can also be used in combination with other features of other example embodiments described above. Reference signs in the claims are not to be regarded as a restriction.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 2 tool
4 base chord
6 layer
8 second material
10 first surface
12 second surface
14 axis of rotation
16 profile contour
18 final contour
20 web
22 flange
24 depression
26 undercut
28 web/component
30 lower chord
32 supporting element
34 aircraft
36 fuselage
38 interior
40 method
42 providing base chord
44 applying at least one layer
46 machining
48 joining
50 machining (depression)

The invention claimed is:

1. A method for producing a supporting element for a transportation device or vehicle, the method comprising:
   providing a flat base chord made of a first material having a first surface and a second surface;
   applying at least one layer of at least one second material to the first surface using a friction-based application method;
   machining the at least one layer of the at least one second material to produce a desired profile cross section of the supporting element; and machining the second surface of the base chord to produce a depression extending along a length of the base chord to receive connecting elements therein;

wherein the profile cross section comprises a web that is attached to the base chord, on the first surface of the base chord; and wherein the first material and the at least one second material are different metallic materials from each other.

2. The method of claim 1, further comprising joining an additional component to the web formed by the at least one layer of the at least one second material.

3. The method of claim 2, wherein the additional component is produced from the at least one second material.

4. The method of claim 1, wherein a profile height of the profile cross section of the supporting element is not constant along the length of the base chord.

5. The method of claim 1:

wherein the profile cross section of the supporting element has at least one lower chord that is opposite the base chord; and wherein the web is connected to and extends between the base chord and the at least one lower chord.

6. The method of claim 1, wherein the first material comprises titanium.

7. The method of claim 1, wherein the at least one second material comprises aluminum.

8. The method of claim 1, wherein the web is directly attached to the base chord.

9. A supporting element for a transportation device or vehicle, the supporting element comprising:

a flat base chord made of a first material having a first surface and a second surface; and at least one layer of at least one second material, which is applied to the first surface using a friction-based application method;

wherein the at least one layer of the at least one second material is machined such that the supporting element has a desired profile cross section;

wherein the second surface of the base chord is machined to produce a depression extending along a length of the base chord to receive connecting elements therein;

wherein the profile cross section comprises a web that is attached to the base chord, on the first surface of the base chord; and wherein the first material and the at least one second material are different metallic materials from each other.

10. The supporting element of claim 9, wherein a profile height of the profile cross section of the supporting element is not constant along the length of the base chord.

11. The supporting element of claim 9:

wherein the profile cross section of the supporting element has at least one lower chord that is opposite the base chord; and wherein the web is connected to and extends between the base chord and the at least one lower chord.

12. The supporting element of claim 9, wherein comprising an additional component connected to the web formed by the at least one layer of the at least one second material.

13. The supporting element of claim 12, wherein the additional component is produced from the at least one second material.

14. The supporting element of claim 9, wherein the supporting element is selected from a group of supporting elements consisting of a floor rail, a crossmember, a longitudinal member, a longeron, a stringer, and a frame.

15. An aircraft having an aircraft fuselage with a structure formed therein, wherein the structure comprises the supporting element of claim 9.

16. The supporting element of claim 9, wherein the first material comprises titanium.

17. The supporting element of claim 9, wherein the at least one second material comprises aluminum.

18. The supporting element of claim 9, wherein the web is directly attached to the base chord.

* * * * *